United States Patent
Rondy et al.

[11] Patent Number: 5,824,731
[45] Date of Patent: Oct. 20, 1998

[54] THERMOPLASTIC CARBON BLACK CONCENTRATES CONTAINING RECLAIM CARBON BLACK

[75] Inventors: Donald R. Rondy, Norton; Frank M. Moore, Louisville, both of Ohio

[73] Assignee: Rondy & Co., Inc., Barberton, Ohio

[21] Appl. No.: 735,461

[22] Filed: Oct. 23, 1996

[51] Int. Cl.$^6$ .............................. C08K 3/10; C09C 1/48
[52] U.S. Cl. ................ 524/496; 423/460; 523/204; 523/351
[58] Field of Search .................. 524/496; 423/460; 427/249; 428/407; 523/204, 351

[56] References Cited

U.S. PATENT DOCUMENTS

| | | | |
|---|---|---|---|
| T940,007 | 11/1975 | Larsen | 585/241 |
| 3,823,223 | 7/1974 | Liska et al. | 423/449.6 |
| 3,992,558 | 11/1976 | Smith-Johannsen | 428/407 |
| 4,171,345 | 10/1979 | Toshev et al. | 585/241 |
| 4,251,500 | 2/1981 | Morita et al. | 423/449 |
| 4,647,443 | 3/1987 | Apffel | 585/241 |
| 4,704,327 | 11/1987 | Scheiber | 264/119 |
| 5,061,363 | 10/1991 | Farcasiu et al. | 585/241 |
| 5,064,523 | 11/1991 | Kretschmar et al. | 585/241 |
| 5,168,012 | 12/1992 | Watson et al. | 428/408 |
| 5,506,274 | 4/1996 | Brown | 521/41 |
| 5,589,531 | 12/1996 | Menashi et al. | 524/496 |

*Primary Examiner*—Vasu Jagannathan
*Assistant Examiner*—Olga Asinovsky
*Attorney, Agent, or Firm*—Hudak & Shunk Co., L.P.A.

[57] ABSTRACT

Thermoplastic carbon black concentrates are provided by blending reclaim carbon black with either a prime thermoplastic or a reclaim thermoplastic wherein the amount of carbon black is generally from about 20 to about 70 parts by weight based upon 100 parts by weight of the carbon black and the thermoplastic. The use of reclaim carbon black is environmentally friendly in that the reclaim carbon black is not disposed in a landfill or a dump but rather is used as an inexpensive source for pigmenting, tinting, or reinforcing thermoplastics.

22 Claims, No Drawings

THERMOPLASTIC CARBON BLACK CONCENTRATES CONTAINING RECLAIM CARBON BLACK

FIELD OF THE INVENTION

The present invention relates to carbon black concentrates made from reclaim carbon black and one or more thermoplastic polymers which may or may not be reclaim.

BACKGROUND OF THE INVENTION

Heretofore, waste or scrap carbon black as from a rubber compounding operation has generally been disposed of in a landfill, a dump, a mine, and the like. Such carbon black is not biodegradable, can easily become airborne and contaminate the surrounding environment, can contaminate ground or land water, and can be a dust hazard. Moreover, the EPA has recently classified carbon black as a potential carcinogen.

In the preparation of carbon black concentrates, prime or virgin carbon black has been utilized with a thermoplastic. The thermoplastic has generally also been prime or virgin although reclaim thermoplastics have also been utilized. Virgin or prime carbon black typically can be lamp black, channel black, or furnace black. Channel black is made by burning natural gas in a limited supply of air and allowing the carbon to deposit on cold iron channels. Furnace blacks are commonly utilized and are made by burning gas or oil in a furnace in a deficient amount of air and removing the carbon as by centrifugation and electrostatic precipitation. The sizes of the various virgin or prime carbon blacks can vary greatly and are generally classified as high structure or low structure (i.e., large or small particle size carbon black).

In U.S. Pat. No. 5,168,012 to Watson, carbon black beads are produced by beading the carbon black powder with an elastomeric latex. Carbon black can also be made by hydrocracking waste rubber as in U.S. Pat. No. 4,251,500, to Morita et al., by pyrolizing scrap vulcanized rubber as in U.S. Pat. No. 4,171,345 to Toshev et al., or as in U.S. Pat. No. 4,647,443 to Apffel, or by destructive distillation of scrap synthetic rubber as in U.S. Pat. No. 3,823,223, to Liska et al.

SUMMARY OF THE INVENTION

Reclaim carbon black, which heretofore has been environmentally undesirable since it has been discarded in a landfill, is utilized to form a concentrated carbon black blend with a prime, virgin or off-grade thermoplastic or a reclaim thermoplastic. Although more fully defined hereinbelow, reclaim carbon black can broadly be described as the waste, scrap, or spent carbon black which has been utilized at least once in a processing or compounding operation and is recovered therefrom. The reclaim carbon black is mixed with a prime or reclaim thermoplastic at a temperature above the thermoplastic softening point until a substantially uniform distribution of the reclaim carbon black is obtained. Small amounts of processing aids such as various metal stearates can be utilized to efficiently and effectively mix the two components. The produced reclaim carbon black concentrate is suitable as a pigment, a tinting additive, or as a reinforcing agent in the manufacture of various thermoplastic compounds, articles, and the like.

DETAILED DESCRIPTION OF THE INVENTION

The reclaim carbon black utilized in the present invention generally can be any type having any desired structure or particle size and generally obtained from any source. Thus, the initially utilized carbon black can be lamp black, channel black, or preferably furnace black. The structure can be high structure, i.e., high surface area, low structure, i.e., low surface area, or otherwise. The ultimate or individual particle size can be small as from about 10 to about 25 nanometers or large as from about 26 to about 60 and even to 90 nanometers (based upon a calculated average particle diameter). The individual particles can be part of larger aggregates whose particle size can be measured in microns or in larger units. The particle size of the aggregates can be broken down by milling. Any grade of carbon black can be utilized such as conducting (CF), fine (FF), high modulus (HMF), high elongation (HEF), reinforcing (RF), semi-reinforcing (SRF), high abrasion (HAF) super abrasion (SAF), fast extruding (FEF), general purpose (GPF), intermediate super abrasion (ISAF), and the like. Virgin, prime or off-grade carbon blacks are readily available as from DeGussa, Cabot, Continental, and the like.

Virgin or prime carbon blacks are often utilized and occasionally off-grade carbon black is utilized in processing and/or compounding operations of one or more polymers or rubbers. The polymers or rubbers generally contain one or more classes of additives such as a filler, a protective compound, an activator, an extender, a cure compound, and the like. Such additives include an antioxidant, a coupling agent such as silane or titanate, a flame retardant, an impact modifier, a lubricant, a mold release agent, a plasticizer, a heat stabilizer, an ultra violet light stabilizer, etc, with rubbers further including accelerators, curatives such as sulfur, one or more oils, and the like.

Reclaim carbon black is generally defined as the spent, airborne, scrap or waste-obtained from any mixing, processing or compounding operation of the blending of virgin, prime, or off-grade (that is, untouched, never used, never compounded or processed, etc.) carbon black with one or more polymers or elastomers. In other words, reclaim carbon black is carbon black which was generally not incorporated into a polymer or rubber, but has impurities (e.g., additives and even small amounts of the polymer or rubber) therein obtained from the mixing, processing or compounding operation. The amount of impurities based upon the total weight of the reclaim carbon black is generally 30 wt. % or less, desirably 20 wt. % or less, and preferably 10 wt. % or less, and more preferably 5 wt. % or less. However, the amount of impurities therein, such as the above-noted additives, are at least about 0.5 wt. %, desirably at least about 1.0 or 2.0 wt. %, and more desirably at least about 3.0 or 4.0 wt. %. These impurities can affect the cure rate of a rubber compound and thus make reclaim carbon black undesirable for reuse in rubber formulations. Thus, heretofore, such carbon black has been dumped in a landfill. These impurities are distinguished from the inherent trace impurities in carbon black as they have not undergone the high temperature degradation process used to produce carbon black.

Sources of reclaim carbon black which can be utilized in the present invention include tire plants, rubber product manufacturers, and polymer blending plants. A specific and perhaps preferred source of reclaim carbon black is that obtained from compounding rubber for use in a tire wherein the compounding ingredients include various oils, accelerators, sulfur, fillers, protective agents, activators, and the like. These ingredients are compounded in an enclosed mixing device such as a Banbury. A filter such as one or more filter socks prevent escape of the adulterated carbon black and this waste or spent carbon black product is utilized as a reclaim carbon black source.

Reclaim carbon black does not include carbon black obtained by the destruction of polymers or rubbers. It thus does not include carbon black obtained from the depolymerization, the pyrolization, the hydrocracking, the destructive distillation, etc., of a polymer or a rubber such as a tire.

In accordance with an aspect of the present invention, the reclaim carbon black can be purified to a degree. Screening can be utilized to remove various large and undesired particles such as metal, wood, paper, and the like. Grinding can also be utilized to reduce the particle size which is usually in the form of agglomerates and to separate impurities therefrom such as metal, wood, etc. Moreover, in order to reduce the amount of some of the additive impurities therein, other methods can be used.

The thermoplastics which can be utilized in the present invention are on one hand prime, or virgin, or off-grade, on the other hand reclaim. By the terms "prime," "virgin," or "off-grade," it is meant that the polymers are the originally produced products and have never been used, recycled, processed, or compounded.

The use of prime, virgin, or off-grade thermoplastics is generally not favored due to cost considerations. Instead, reclaim thermoplastics are preferred. Reclaim thermoplastics have generally been processed and/or compounded and the spent, scrap or waste thereof contains various additives therein such as those noted hereinabove with regard to carbon black and hence will not be repeated but rather are hereby incorporated by reference. Sources of reclaim thermoplastic include the production of film, foam, sheet, extrusion, and molding. For example, a typical source is the flashing or scrap left over from the molding operation such as an injection molding operation or an extruder operation. Rather than to discard such material in a landfill or otherwise dispose of the same, it can constitute the reclaim thermoplastic feed stock of the present invention. Other sources of reclaim thermoplastic include the waste obtained from a mixing operation such as clean out, or the "tailings and trim" of a calendar, or purge from a sheeting operation.

The reclaim thermoplastic generally contains 30% or less of additives or impurities therein, desirably 20% by weight or less, preferably 10% or less and even 5% or less by weight. The level of impurity which can be tolerated will depend upon the end use of the reclaim thermoplastic. The reclaim thermoplastic is generally ground into small particles and typically screened to removed contaminants such as metal, wood, paper, and the like. Moisture can also be removed by elevated temperature as in an extrusion operation, or the like. The remaining impurities such as lubricating aids, compounding aids, antioxidants, UV inhibitors, and the like, are generally not a problem with regard to the preparation of a carbon black concentrate inasmuch as low amounts of the carbon black concentrate will be utilized in preparation of the thermoplastic end product, and inasmuch as the thermoplastic utilized to make the end product or article will often contain the same compounding or processing aids therein. The minimum amount of impurities, and hence generally the demarcation between "prime," "virgin," or "off-grade" and reclaim thermoplastic is at least 0.25%, more desirably 0.5 or 0.75%, and even 2, 3, or 4% by weight based upon the total weight of the reclaim thermoplastic.

Generally, any class of reclaim thermoplastic can be utilized such as various polyolefins, which are made from monomers containing from 2 to 4 or 5 carbon atoms. Suitable polyolefins include polyethylene as well as low density polyethylene, high density polyethylene, ultra high density polyethylene, etc., polypropylene, and the like. Chlorinated polyethylene, chlorinated polypropylene, chlorosulfonated polyethylene, etc., can also be utilized. Polyethylene and polypropylene are preferred reclaim thermoplastics.

Another class of suitable reclaim thermoplastics are derived from various vinyl or vinylidene polymers. Thus, reclaim polyvinylchloride, chlorinated polyvinylchloride, can be utilized. Other types of vinyl polymers are those derived from vinyl substituted aromatics having from 8 to 12 carbon atoms, such as styrene, α-methylstyrene, and the like. Still another class of vinyl polymers are various acrylates or methacrylates wherein the ester portion has from 2 to 10 carbon atoms such as ethyl acrylate, butyl acrylate, 2ethylhexyl acrylate, and the like. Various vinyl esters such as vinyl acetate can also be used. Thermoplastic copolymers of two or more monomers from the above polymers may be used. Examples include ethylene vinyl acetate copolymers.

The various fluorocarbon polymers constitute another class of thermoplastic compounds which can be utilized and include polytetrafluoroethylene, polyvinyl fluoride, polyvinylidene fluoride, various chloro-fluoro polymers such as polychorotrifluoroethylene, and the like. Various polyamides, i.e., nylons, can also be utilized wherein the amide portion has 4 to 12 carbon atoms and the ester portion can have from 4 to 12 carbon atoms. Representative examples of polyamides include Nylon 6,6, Nylon 610, Nylon 4,6, Nylon 6,9, as well as the various internal nylons such as Nylon 11, Nylon 12, and the like.

A large and preferred class of thermoplastic polymers is the various polyesters which can be made from aliphatic or aromatic acids and diols. Specific types of polyesters are numerous with some of the more common polyesters being polyethyleneterephthalate, polybutyleneterephthalate, and the like. Also included within the class of esters are various polycarbonates.

In order to aid in the mixing and dispersion of the reclaim carbon black and the thermoplastic with one another, a processing aid such as a lubricant is utilized. Suitable lubricants include various metal stearates with calcium stearate and zinc stearate being preferred. The amount of such stearates is generally from about 0.1 to about 2.5, desirably from about 0.15 to about 1.0, and preferably from about 0.25 to about 0.75 parts by weight per 100 total parts by weight of the reclaim carbon black and the thermoplastic.

The reclaim carbon black and the thermoplastic which preferably is reclaim thermoplastic are mixed in an internal mixer. That is, the mixture is sealed or enclosed and can be any conventional internal mixer such as a Banbury, an extruder, and the like. The order of addition of the reclaim carbon black or reclaim thermoplastic, etc., is not important. However, it is important that the mixture is heated to a temperature above the softening point of the thermoplastic but generally below the melting point thereof, and the components blended for an effective or sufficient amount of time so that they are dispersed or mixed into one another. In other words, the mixing is continued until a substantially uniform distribution of the reclaim carbon black particles is obtained within the thermoplastic. By the term "uniform distribution" it is meant that generally a thoroughly mixed or heterogeneous mixture is obtained.

The amount of carbon black utilized to form the thermoplastic carbon black concentrates of the present invention is generally from about 20 or 30 to about 70 parts, desirably from about 40 to about 60 parts, and preferably from about 45 to about 55 parts by weight based upon 100 total parts by weight of the reclaim carbon black and the thermoplastic. Generally, amounts of carbon black in excess of 70 parts by weight, while still capable of being utilized as a concentrate, are undesirable inasmuch as they are not dust-free, that is, not all of the carbon black is dispersed or incorporated within the thermoplastic but is free to escape. By the term "dust-free" it is meant that generally less than 1% or 0.5% by weight, desirably less than 0.3% or 0.1% by weight of the reclaim carbon black based upon the total weight of the reclaim carbon black and the thermoplastic, and preferably nil or no carbon black, is loose, that is, not incorporated into the thermoplastic carbon concentrate so that upon subsequent handling, mixing, processing, compounding, etc., it can escape and cause dusting problems, etc. The carbon black concentrate is generally in the form of small pellets, as for example, about 1/8 of an inch in diameter and can be formed by any process as by extruding and pelletizing the same. Generally, mixing times to achieve a substantially uniform distribution are short such as from about a couple of minutes to about 10 or 15 minutes, and often from about three to about five minutes.

The carbon black concentrates of the present invention can be used wherever carbon black is desired as a pigment, a tint, or colorant or a reinforcing agent in association with a feed stock thermoplastic to form sheeting, end products, articles, and the like. Naturally, the amount of the thermoplastic carbon black concentrate of the present invention utilized will depend upon the desired color, shade, tint, etc. (e.g., from light gray to black) of the end product, etc., and thus can vary, for example, from about 0.1 to about 10 parts by weight, from about 0.3 to about 5 parts by weight, and desirably from about 0.5 to about 3 or 4 parts by weight based upon 100 total parts by weight of the feed stock thermoplastic being tinted or compounded. The present invention furthermore is very ecologically desirably in that the carbon black concentrates overcome environmental problems in that reclaim carbon black and reclaim thermoplastic need no longer be dumped into a landfill.

The end products, articles, in which the thermoplastic carbon black concentrate of the present invention can be blended are numerous. Typical end uses of the pigmented, tinted, etc., feed stock thermoplastics include various products such as construction materials, agricultural articles, automotive parts, household packaging, and the like. The products can be in the form of a film, a foam, a pipe or conduit, molded goods or articles, etc.

The invention will be better understood by reference to the following examples which serve to illustrate, but not to limit the scope of the present invention.

EXAMPLE

A reclaim carbon black from the dust collection system of a tire compounding plant was mixed in an internal lab mixer with a reclaim extrusion purge low density polyethylene (LDPE) resin. The proportions were 40 parts by weight of reclaim carbon black and 60 parts by weight of reclaim LDPE. The mixture was heated to a temperature which insured good dispersion, that is, at a temperature above the softening point of the LDPE. A small amount of processing aid, i.e., 0.25 parts by weight of calcium stearate per 100 parts by weight of the reclaim carbon black-reclaim LDPE mixture, was added and the mixture mixed for approximately 5 minutes. The batch was then dumped. The resulting carbon black concentrate was fed into a lab extruder and pelletized with the pellets having the size of from about 1/16 to 1/4 inch. The pelletized concentrate was then added to a prime LDPE resin in an amount of about 4 parts by weight per 100 parts by weight of the prime resin and extruded into a thin sheet. The thin sheet was successfully tinted black, was smooth, and had no surface flaws.

While in accordance with the Patent Statutes, the best mode and preferred embodiment has been set forth, the scope of the invention is not limited thereto, but rather by the scope of the attached claims.

What is claimed is:

1. A carbon black concentrate, comprising a blend of a thermoplastic and a reclaim carbon black, said reclaim carbon black prior to blending being substantially unincorporated into a polymer or rubber and wherein said reclaim carbon black does not include carbon black obtained by destruction of polymers or rubbers, and the amount of said carbon black being from about 20 parts to about 70 parts by weight per 100 total parts by weight of said reclaim carbon black and said thermoplastic.

2. A carbon black concentrate according to claim 1, wherein said reclaim carbon black has impurities therein in the amount of about 30% or less.

3. A carbon black concentrate according to claim 2, wherein the amount of said reclaim carbon black in said blend is from about 40 parts to about 60 parts by weight, wherein the amount of impurities in said reclaim carbon black is from about 1% to about 10% by weight.

4. A carbon black concentrate according to claim 3, wherein said blend contains from about 0.1 to about 2.5 parts by weight of a processing aid per 100 parts by weight of said thermoplastic and said reclaim carbon black.

5. A carbon black concentrate according to claim 4, wherein the amount of reclaim carbon black in said blend is from about 45 to about 55 parts by weight, wherein said processing aid is calcium stearate, zinc stearate, or combinations thereof, and wherein said thermoplastic is polyester, polyethylene, polypropylene, or combinations thereof.

6. A carbon black concentrate according to claim 4, wherein said blend is dust-free.

7. A carbon black concentrate according to claim 2, wherein said thermoplastic is a reclaim thermoplastic.

8. A carbon black concentrate according to claim 5, wherein said thermoplastic is a reclaim thermoplastic.

9. A carbon black concentrate according to claim 6, wherein said thermoplastic is a reclaim thermoplastic.

10. A process for providing a dust-free carbon black concentrate, comprising the steps of;

mixing recovered, airborne reclaim carbon black with a thermoplastic at a temperature above the softening point of said thermoplastic, and forming a carbon black concentrate wherein said reclaim carbon black is dispersed in said thermoplastic, and wherein said reclaim carbon black has impurities therein in the amount of about 30% by weight or less.

11. A process according to claim 10, wherein said thermoplastic is a reclaim thermoplastic, wherein the amount of said reclaim carbon black is from about 20 parts to about 70 parts by weight based upon the 100 total parts by weight of said reclaim carbon black and said reclaim thermoplastic, wherein the amount of said impurities in said reclaim carbon black is from about 1% to about 10% by weight, and wherein said reclaim thermoplastic has impurities therein in the amount of from about 1% to about 10% by weight.

12. A process according to claim 11, wherein the amount of said reclaim carbon black is from about 40 parts to about 60 parts by weight, and including forming a dust-free carbon black concentrate having less than about 0.5% by weight of loose carbon black therein based upon the total weight of the said reclaim carbon black and said reclaim thermoplastic.

13. A process according to claim 12, wherein said reclaim carbon black and said reclaim thermoplastic are mixed at a temperature below the melting point of the said thermoplastic, and wherein said thermoplastic is polyester, polyethylene, polypropylene, or combinations thereof.

14. A process for forming a thermoplastic blend containing reclaim carbon black, comprising;

reclaiming carbon black from a rubber or polymer mixing, processing, or compounding operation in which said reclaim carbon black is substantially unincorporated into a polymer or rubber, mixing said reclaim carbon black with a thermoplastic polymer at a temperature above the softening point of the thermoplastic polymer and forming a carbon black concentrate, the amount of said reclaim carbon black being from about 20 to about 70 parts by weight per 100 total parts by weight of said reclaim carbon black and said thermoplastic.

15. A process according to claim 14, wherein the amount of said reclaim carbon black is from about 30 parts to about 70 parts by weight, wherein said carbon black concentrate is dust-free, wherein said thermoplastic polymer is a reclaim thermoplastic polymer, and wherein said carbon black concentrate contains from about 0.1 to about 2.5 parts by weight of a metal stearate per 100 parts by weight of said reclaim carbon black and said reclaim thermoplastic.

16. A process according to claim 15, wherein said carbon black concentrate contains about 0.5% by weight or less of loose carbon black based upon the total weight of said reclaim carbon black and said reclaim thermoplastic, and wherein said reclaim thermoplastic is polyester, polypropylene, or polyethylene, or combinations thereof.

17. A carbon black concentrate as set forth in claim 2, further incorporated into a thermoplastic feedstock composition in an amount effective to color said feedstock.

18. A carbon black concentrate as set forth in claim 2, in an amount of from about 0.1 to about 10 parts by weight further incorporated into additional thermoplastic to form a thermoplastic feedstock, said amount based upon 100 parts of said feedstock.

19. A carbon black concentrate as set forth in claim 5, in an amount of from about 0.1 to about 10 parts by weight incorporated into additional thermoplastic to form a thermoplastic feedstock, said amount based upon 100 parts by weight of said feedstock.

20. A carbon black concentrate as set forth in claim 6, in an amount of from about 0.1 to about 10 parts by weight incorporated into additional thermoplastic to form a thermoplastic feedstock, said amount based upon 100 parts by weight of said feedstock.

21. A thermoplastic according to claim 1, wherein said thermoplastic is a virgin, a reclaim, an off-grade, or a prime thermoplastic, or combinations thereof.

22. A carbon black concentrate, comprising;

a blend of a thermoplastic with a reclaim carbon black, said reclaim carbon black being obtained from a filter of a mixing, processing, or compounding operation, the amount of said reclaim carbon black being from about 20 parts to about 70 parts by weight per 100 total parts by weight of said reclaim carbon black and said thermoplastic.

* * * * *